United States Patent
Sakakibara et al.

(10) Patent No.: US 9,484,744 B2
(45) Date of Patent: Nov. 1, 2016

(54) SCHEDULING APPARATUS, SCHEDULING METHOD AND COMPUTER-READABLE STORAGE MEDIUM

(71) Applicant: KABUSHIKI KAISHA TOSHIBA, Tokyo (JP)

(72) Inventors: Shizu Sakakibara, Yokohama (JP); Tomoshi Otsuki, Kawasaki (JP); Hideyuki Aisu, Kawasaki (JP); Minoru Yonezawa, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 665 days.

(21) Appl. No.: 13/759,488

(22) Filed: Feb. 5, 2013

(65) Prior Publication Data

US 2013/0253717 A1    Sep. 26, 2013

(30) Foreign Application Priority Data

Mar. 21, 2012 (JP) .................................. 2012-064230

(51) Int. Cl.
  *H02J 3/14* (2006.01)
  *G06Q 50/06* (2012.01)

(52) U.S. Cl.
  CPC ................. *H02J 3/14* (2013.01); *G06Q 50/06* (2013.01); *H02J 2003/143* (2013.01); *Y02B 70/3266* (2013.01); *Y04S 20/242* (2013.01); *Y10T 307/469* (2015.04)

(58) Field of Classification Search
  None
  See application file for complete search history.

(56) References Cited

U.S. PATENT DOCUMENTS

| 8,880,226 | B2 * | 11/2014 | Raman et al. | 700/277 |
| 2011/0106328 | A1 * | 5/2011 | Zhou et al. | 700/291 |
| 2011/0231320 | A1 * | 9/2011 | Irving | G06Q 30/00 705/80 |
| 2012/0065792 | A1 | 3/2012 | Yonezawa et al. | |
| 2013/0254151 | A1 * | 9/2013 | Mohagheghi et al. | 706/46 |
| 2014/0316973 | A1 * | 10/2014 | Steven et al. | 705/37 |

FOREIGN PATENT DOCUMENTS

| JP | 9-120417 | 5/1997 |
| JP | 2007-102684 | 4/2007 |
| JP | 2008-295193 | 12/2008 |
| JP | 2010-166636 | 7/2010 |
| JP | 2013-30127 A | 2/2013 |

OTHER PUBLICATIONS

Office Action issued Jun. 13, 2014 in corresponding Japanese Patent Application No. 2012-064230 (with Partial English translation).

* cited by examiner

*Primary Examiner* — Ryan Jarrett
(74) *Attorney, Agent, or Firm* — Oblon, McClelland, Maier & Neustadt, L.L.P

(57) ABSTRACT

A scheduling apparatus includes a first calculator, a storage, and a second calculator. The first calculator is configured to calculate an assignment of plural time slots to a consumer. Each of the plural time slots is classified into at least any of plural categories. The storage is configured to store a first demand, from the consumer, regarding an extent to which the categories associated with the assignment are biased. The second calculator is configured to calculate an extent to which the categories associated with the assignment calculated by the first calculator are biased and calculate a first evaluation value representing a deviation between the first demand and an extent to which the categories associated with the assignment calculated by the first calculator are biased. The first calculator calculates the assignment so as to optimize an evaluation function including the first evaluation value.

7 Claims, 17 Drawing Sheets

FIG. 3

| ELECTRICITY CONSUMER SET J | ELECTRIC ENERGY THAT CAN BE SAVED |
|---|---|
| ELECTRICITY CONSUMER 1 | 2 |
| ELECTRICITY CONSUMER 2 | 4 |
| ELECTRICITY CONSUMER 3 | 3 |
| ELECTRICITY CONSUMER 4 | 2 |
| ELECTRICITY CONSUMER 5 | 1 |

*FIG. 4*

| TIME SLOT SET I | ELECTRIC ENERGY TO BE SAVED |
|---|---|
| 1ST DAY 09:00~12:00 | 5 |
| 1ST DAY 12:00~15:00 | 4 |
| 1ST DAY 15:00~18:00 | 2 |
| 2ND DAY 09:00~12:00 | 5 |
| 2ND DAY 12:00~15:00 | 2 |
| 2ND DAY 15:00~18:00 | 4 |
| 3RD DAY 09:00~12:00 | 2 |
| 3RD DAY 12:00~15:00 | 1 |
| 3RD DAY 15:00~18:00 | 3 |
| 4TH DAY 09:00~12:00 | 6 |
| 4TH DAY 12:00~15:00 | 2 |
| 4TH DAY 15:00~18:00 | 1 |
| 5TH DAY 09:00~12:00 | 1 |
| 5TH DAY 12:00~15:00 | 1 |
| 5TH DAY 15:00~18:00 | 3 |
| 6TH DAY 09:00~12:00 | 6 |
| 6TH DAY 12:00~15:00 | 1 |
| 6TH DAY 15:00~18:00 | 1 |
| 7TH DAY 09:00~12:00 | 5 |
| 7TH DAY 12:00~15:00 | 2 |
| 7TH DAY 15:00~18:00 | 4 |

FIG. 5

| ELECTRICITY CONSUMER SET J | DEMAND |
|---|---|
| ELECTRICITY CONSUMER 1 | BIAS |
| ELECTRICITY CONSUMER 2 | NOT-BIAS |
| ELECTRICITY CONSUMER 3 | BIAS |
| ELECTRICITY CONSUMER 4 | NOT-BIAS |
| ELECTRICITY CONSUMER 5 | BIAS |

FIG. 6

| ELECTRICITY CONSUMER SET J | DEMAND |
|---|---|
| ELECTRICITY CONSUMER 1 | 2 DAYS |
| ELECTRICITY CONSUMER 2 | 2 DAYS |
| ELECTRICITY CONSUMER 3 | 1 DAY |
| ELECTRICITY CONSUMER 4 | 2 DAYS |
| ELECTRICITY CONSUMER 5 | 1 DAY |

FIG. 7

| i\j | 1ST DAY 09:00~12:00 | 1ST DAY 12:00~15:00 | 1ST DAY 15:00~18:00 | 2ND DAY 09:00~12:00 | 2ND DAY 12:00~15:00 | 2ND DAY 15:00~18:00 | 3RD DAY 09:00~12:00 | 3RD DAY 12:00~15:00 | 3RD DAY 15:00~18:00 | 4RD DAY 09:00~12:00 | 4RD DAY 12:00~15:00 | 4RD DAY 15:00~18:00 | 5RD DAY 09:00~12:00 | 5RD DAY 12:00~15:00 |
|---|---|---|---|---|---|---|---|---|---|---|---|---|---|---|
| xij |   |   |   |   |   |   |   |   |   |   |   |   |   |   |
| 1 | 1ST DAY 09:00~12:00 | 1 | 1 | 1 | 1 | 1 | 1 | 0 | 0 | 0 | 0 | 0 | 0 | 0 | 0 |
| 0 | 1ST DAY 12:00~15:00 | 0 | 0 | 0 | 0 | 0 | 0 | 0 | 0 | 0 | 0 | 0 | 0 | 0 | 0 |
| 0 | 1ST DAY 15:00~18:00 | 0 | 0 | 0 | 0 | 0 | 0 | 0 | 0 | 0 | 0 | 0 | 0 | 0 | 0 |
| 0 | 2ND DAY 09:00~12:00 | 0 | 0 | 0 | 0 | 1 | 1 | 1 | 1 | 1 | 0 | 0 | 0 | 0 | 0 |
| 1 | 2ND DAY 12:00~15:00 | 0 | 0 | 0 | 0 | 0 | 0 | 0 | 0 | 0 | 0 | 0 | 0 | 0 | 0 |
| 0 | 2ND DAY 15:00~18:00 | 0 | 0 | 0 | 0 | 0 | 0 | 0 | 0 | 0 | 0 | 0 | 0 | 0 | 0 |
| 0 | 3RD DAY 09:00~12:00 | 0 | 0 | 0 | 0 | 0 | 0 | 0 | 0 | 0 | 0 | 0 | 0 | 0 | 0 |
| 0 | 3RD DAY 12:00~15:00 | 0 | 0 | 0 | 0 | 0 | 0 | 0 | 0 | 0 | 1 | 1 | 1 | 1 | 1 |
| 1 | 3RD DAY 15:00~18:00 | 0 | 0 | 0 | 0 | 0 | 0 | 0 | 0 | 0 | 0 | 0 | 0 | 0 | 0 |
| 0 | 4TH DAY 09:00~12:00 | 0 | 0 | 0 | 0 | 0 | 0 | 0 | 0 | 0 | 0 | 0 | 0 | 0 | 0 |
| 0 | 4TH DAY 12:00~15:00 | 0 | 0 | 0 | 0 | 0 | 0 | 0 | 0 | 0 | 0 | 0 | 0 | 0 | 0 |
| 0 | 4TH DAY 15:00~18:00 | 0 | 0 | 0 | 0 | 0 | 0 | 0 | 0 | 0 | 0 | 0 | 0 | 0 | 0 |
| 1 | 5TH DAY 09:00~12:00 | 0 | 0 | 0 | 0 | 0 | 0 | 0 | 0 | 0 | 0 | 0 | 0 | 0 | 0 |
| 0 | 5TH DAY 12:00~15:00 | 0 | 0 | 0 | 0 | 0 | 0 | 0 | 0 | 0 | 0 | 0 | 0 | 0 | 0 |
| 0 | 5TH DAY 15:00~18:00 | 0 | 0 | 0 | 0 | 0 | 0 | 0 | 0 | 0 | 0 | 0 | 0 | 0 | 0 |
| 0 | 6TH DAY 09:00~12:00 | 0 | 0 | 0 | 0 | 0 | 0 | 0 | 0 | 0 | 0 | 0 | 0 | 0 | 0 |
| 1 | 6TH DAY 12:00~15:00 | 0 | 0 | 0 | 0 | 0 | 0 | 0 | 0 | 0 | 0 | 0 | 0 | 0 | 0 |
| 0 | 6TH DAY 15:00~18:00 | 0 | 0 | 0 | 0 | 0 | 0 | 0 | 0 | 0 | 0 | 0 | 0 | 0 | 0 |
| 0 | 7TH DAY 09:00~12:00 | 0 | 0 | 0 | 0 | 0 | 0 | 0 | 0 | 0 | 0 | 0 | 0 | 0 | 0 |
| 0 | 7TH DAY 12:00~15:00 | 0 | 0 | 0 | 0 | 0 | 0 | 0 | 0 | 0 | 0 | 0 | 0 | 0 | 0 |
| 1 | 7TH DAY 15:00~18:00 | 0 | 0 | 0 | 0 | 0 | 0 | 0 | 0 | 0 | 0 | 0 | 0 | 0 | 0 |

FIG. 16

| ELECTRICITY CONSUMER SET J | DEMAND (W1) | DEMAND (W2) |
|---|---|---|
| ELECTRICITY CONSUMER 1 | BIAS | BIAS |
| ELECTRICITY CONSUMER 2 | NOT-BIAS | BIAS |
| ELECTRICITY CONSUMER 3 | BIAS | NOT-BIAS |
| ELECTRICITY CONSUMER 4 | NOT-BIAS | NOT-BIAS |
| ELECTRICITY CONSUMER 5 | BIAS | BIAS |

FIG. 17

| ELECTRICITY CONSUMER SET J | ELECTRIC ENERGY THAT CAN BE SAVED (LEVEL 0) | ELECTRIC ENERGY THAT CAN BE SAVED (LEVEL 1) | ELECTRIC ENERGY THAT CAN BE SAVED (LEVEL 2) |
|---|---|---|---|
| ELECTRICITY CONSUMER 1 | 2 | 5 | 7 |
| ELECTRICITY CONSUMER 2 | 4 | 7 | 9 |
| ELECTRICITY CONSUMER 3 | 3 | 6 | 8 |
| ELECTRICITY CONSUMER 4 | 2 | 5 | 7 |
| ELECTRICITY CONSUMER 5 | 1 | 4 | 6 |

SCHEDULING APPARATUS, SCHEDULING METHOD AND COMPUTER-READABLE STORAGE MEDIUM

CROSS REFERENCE TO RELATED APPLICATION(S)

The present disclosure relates to the subject matters contained in Japanese Patent Application No. 2012-064230 filed on Mar. 21, 2012, which is incorporated herein by reference in its entirety.

TECHNICAL FIELD

Embodiments discussed herein relate generally to a scheduling apparatus, a scheduling method, and a computer-readable storage medium.

BACKGROUND

Techniques have been proposed which allow, for example, a electric supply company which generates or distributes power to control a balance between electricity supply and electricity demand in the entire electricity supply system to operate by requesting electricity consumers to reduce their electricity consumptions. Electricity reduction requests to electricity consumers may be made so that each electricity consumer will suffer least reduction in comfort and convenience.

BRIEF DESCRIPTION OF THE DRAWINGS

FIG. 3 shows an example of electricity consumer information according to the first embodiment;
FIG. 4 shows an example of time slot information according to the first embodiment;
FIG. 5 shows an example of bias information according to the first embodiment;
FIG. 6 shows an example of interval information according to the first embodiment;
FIG. 7 shows an example of a matrix according to the first embodiment;
FIG. 16 shows an example of bias information according to the second embodiment;
and
FIG. 17 shows an example of electricity consumer information according to the second embodiment.

DETAILED DESCRIPTION

According to one embodiment, a scheduling apparatus includes a first calculator, a storage, and a second calculator. The first calculator is configured to calculate an assignment of plural time slots. Each of the plural time slots is classified into at least any of plural categories, to a consumer. The storage is configured to store a first demand, from the consumer, regarding an extent to which the categories associated with the assignment are biased. The second calculator is configured to calculate an extent to which the categories associated with the assignment calculated by the first calculator are biased and calculate a first evaluation value representing a deviation between the first demand and an extent to which the categories associated with the assignment calculated by the first calculator are biased. The first calculator calculates the assignment so as to optimize an evaluation function including the first evaluation value.

Hereinafter, exemplary embodiments will be described in detail below with reference to the accompanying drawings.

(Embodiment 1)

Figure 1:
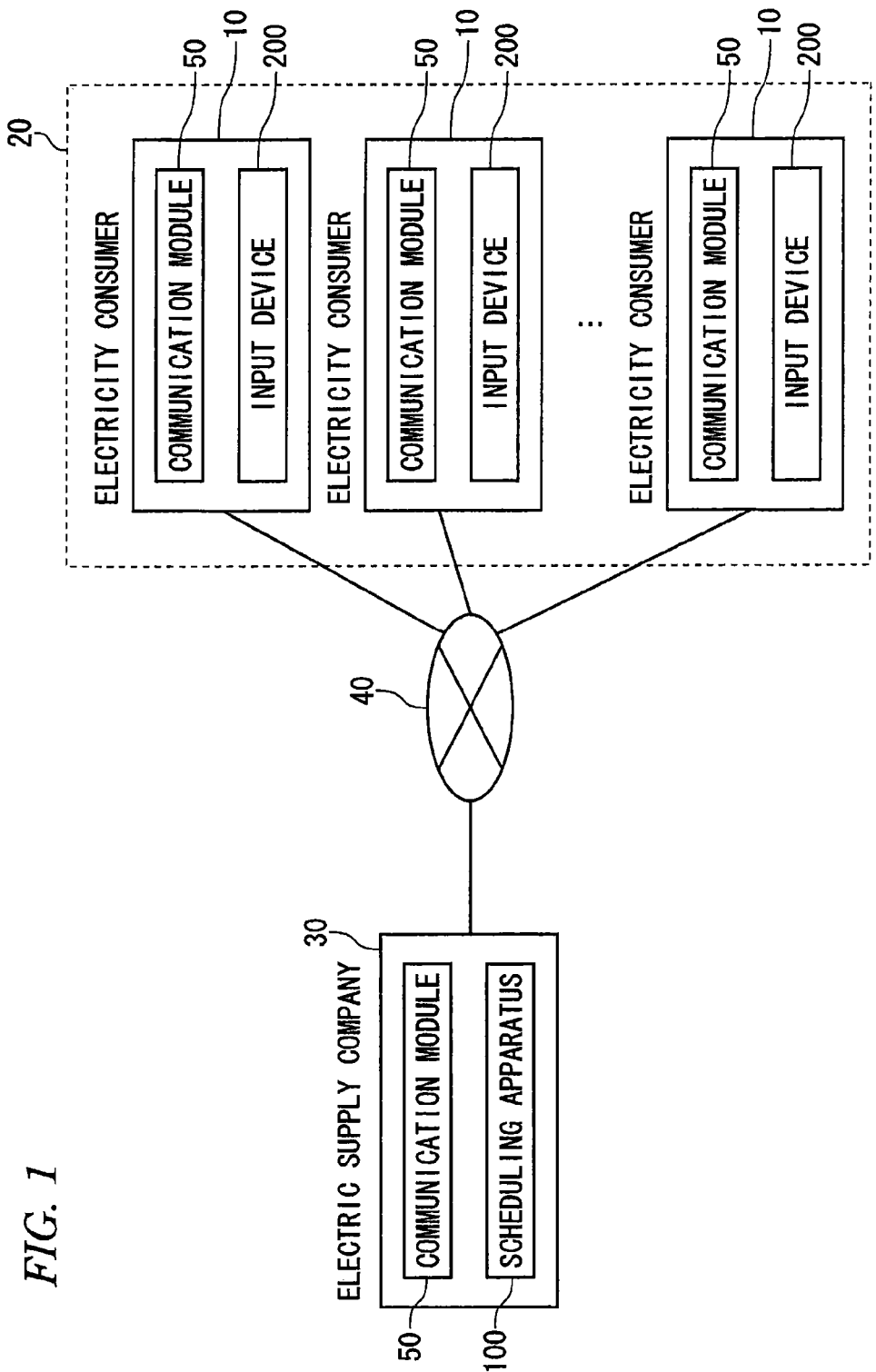
FIG. 1 is a schematic view of a power control system.

FIG. 1 is a schematic view of a power control system. This power control system generally includes a group 20 of plural electricity consumers 10 who consume electricity and a electric supply company 30 which supplies electricity to each of the electricity consumers 10 of the group 20. Each electricity consumer 10 and the electric supply company 30 are connected to each other via a network 40 which includes the Internet or a power network.

The electric supply company 30 is equipped with a scheduling apparatus 100 according to the first embodiment and a communication module 50. The electric supply company 30 requests the individual electricity consumers 10 to reduce their electricity consumptions via the communication module 50, in accordance with a demand response (hereinafter may be abbreviated as "DR") program created by the scheduling apparatus 100. Each electricity consumer 10 is equipped with an input device 200 with which each electricity consumer 10 inputs information and a communication module 50. Information that is input by each electricity consumer 10 via the input device 200 can be sent to the scheduling apparatus 100 over the network 40.

Examples of the electricity consumers 10 include an ordinary home and an office building. The group 20 may be a set of ordinary homes, a set office buildings, or a set of ordinary homes and office buildings. The electric supply company 30 may be either a company which generates and distributes electricity as a business or a company which only distributes electricity as a business.

The scheduling apparatus 100 according to the first embodiment will be described below in detail with reference to the accompanying drawings. It is assumed as an example that the scheduling apparatus 100 creates a program which covers one week starting from the present day (a period of the program). It is also assumed that categories of time slots in which DR is performed include three types, that is, a morning slot (9:00 to 12:00), a daytime slot (12:00 to 15:00), and an evening slot (15:00 to 18:00).

The scheduling apparatus 100 according to the first embodiment evaluates dissatisfaction degrees of the electricity consumers 10 which are attributed to days/times of time slots such as continuousness of a time slot to which DR is allocated or bias of categories of time slots to which DR is allocated, and creates a DR program so as to minimize the dissatisfaction degrees of the electricity consumers 10.

Figure 2:
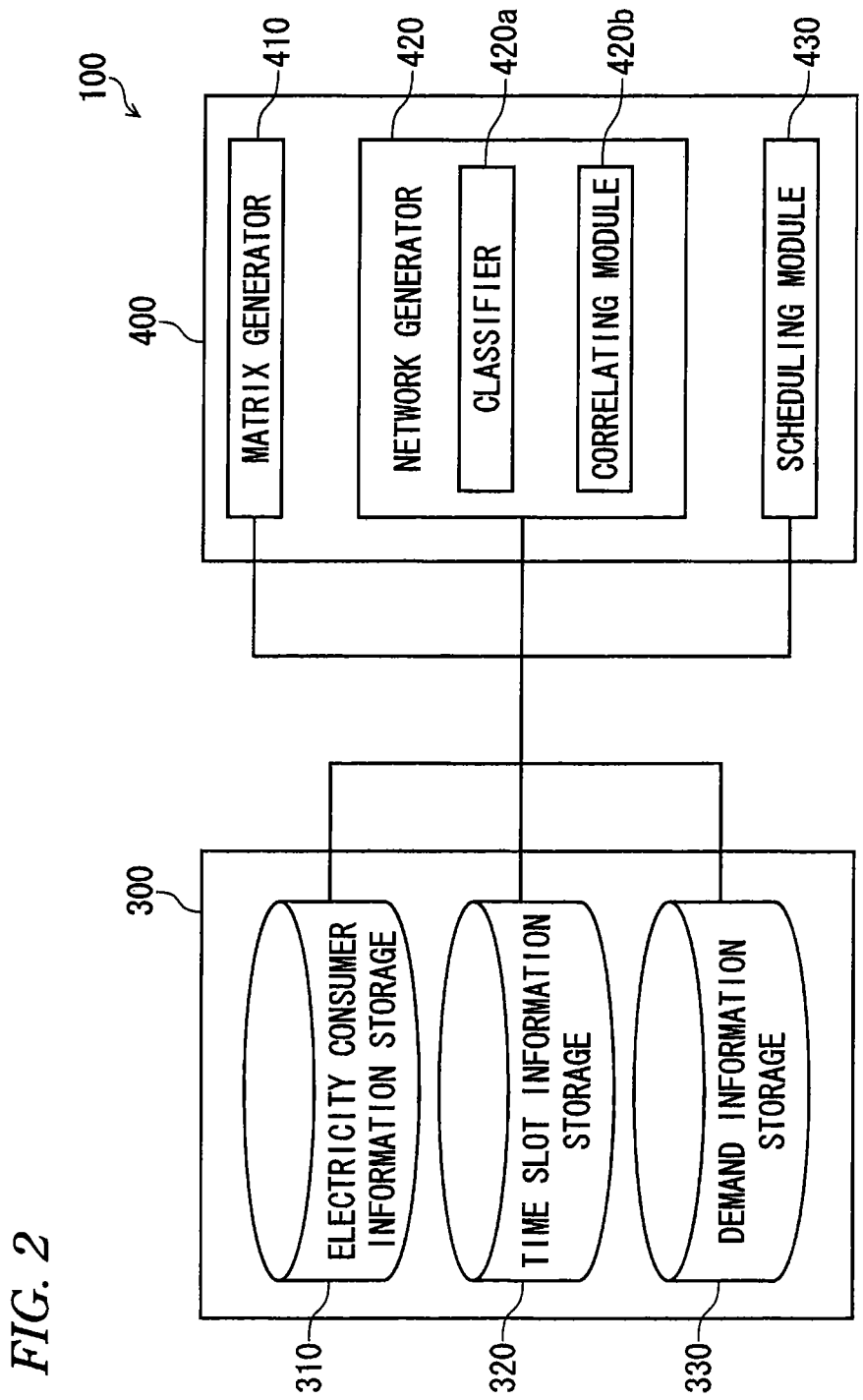
FIG. 2 shows the block diagram of a scheduling apparatus according to a first embodiment.

FIG. 2 shows the block diagram of the scheduling apparatus 100 according to the first embodiment. The scheduling apparatus 100 includes an electricity consumer information storage 310, a time slot information storage 320, a demand information storage 330, a matrix generator 410, a network generator 420, and a scheduling module 430. The electricity consumer information storage 310, the time slot information storage 320, and the demand information storage 330 may be implemented by a storage device 300 such as a memory or an HDD. The matrix generator 410, the network generator 420, and the scheduling module 430 may be implemented by a computing device 400 such as a CPU.

(Storage Device 300)

The electricity consumer information storage 310 stores pieces of information (electricity consumer information) indicating electric energy (kWh) that can be saved by one electricity saving attempt made by the respective electricity consumers 10 in a time slot in response to the DR. FIG. 3 shows an example of the electricity consumer information. Although the same electric energy is set for every time slot in this example, different electric energy may be set for the respective time slots.

The scheduling apparatus 100 may receive pieces of electricity consumer information that are input regularly by the respective electricity consumers 10 using their input devices 200 and transmitted from their communication units 50 over the network 40, and the storage device 300 may store the received electric consumer information. Alternatively, a predictor (not shown) may predict electric energy, which can be saved by one electricity saving attempt made by the respective electricity consumers 10 in a time slot in response to the DR, based on past trends and store the predicted electric energy in the electricity consumer information storage 310.

The time slot information storage 320 stores pieces of information (time slot information) indicating electric energy (kWh) that need to be saved by the entire group 20 in respective time slots. FIG. 4 shows an example of the time slot information.

The predictor (not shown) may calculate a gap value in each time slot between (i) demanded electric energy (kWh) of the entire group 20 that is predicted based on past trends and (ii) scheduled electricity generation (kWh) and store the calculated gap value in the time slot information storage 320 in advance as the time slot information.

The demand information storage 330 stores demands of the individual electricity consumers 10 on the DR. The demand information storage 330 stores information (bias information) indicating a first demand from each electricity consumer 10 on bias (an extent to which categories of time slots in which each electricity consumer 10 is subjected to the DR are biased) of categories of time slots in which each electricity consumers 10 is subjected to the DR in a scheduled period or bias, in each kind of the categories, of the numbers of times the categories of the time slots in which each electricity consumers 10 is subjected to the DR in the scheduled period. Hereinafter, a time slot in which each electricity consumers 10 is subjected to the DR (the DR is assigned to each electricity consumer 10) in a scheduled period may be referred to as a "DR time slot". The demand information storage 330 also stores information (interval information) indicating a second demand from each electricity consumer 10 on an interval (an extent to which the DR time slots are continuous) between an electricity saving attempt upon receipt of the DR and a next electricity saving attempt.

Each electricity consumer 10 may make, as the extent to which the categories of the DR time slots are biased, (i) a demand that the number of DR time slots of a certain category be much larger than the numbers of DR time slots of the other categories (i.e., the peak number exist; the categories of the DR time slots be biased) or (ii) a demand that the numbers of DR time slots of the respective categories not-bias (not biased). A predetermined threshold value may be used as a criterion for judging as to whether the categories of the time slots are "biased" or "not biased".

More specifically, if absolute values of differences between the numbers of DR time slots of the respective categories and an average number ((the total number of DR time slots in each kind of categories)/(the number of categories in each kind of categories)) are smaller than a predetermined threshold value, the categories may be deemed as being "not biased" (uniform). On the other hand, if an absolute value of a difference between the number of DR time slots of any of the categories and the average number is larger than the predetermined threshold value, the DR time slots may be deemed as being "biased" to the certain category.

FIG. 5 shows an example of bias information according to the first embodiment. In this example, each electricity consumer 10 regularly inputs "bias" or "not-bias" as the first demand through its input device 200. Then, the communication module 50 of the electric supply company 30 receives such bias information via the network 40 and stores the received demand information in the demand information storage 330.

FIG. 6 shows an example of interval information according to the first embodiment. In this example, each electricity consumer 10 regularly inputs the number of days indicating an interval between electricity saving attempts as the second demand through its input device 200. Then, the communication module 50 of the electric supply company 30 receives such interval information via the network 40 and stores the received demand information in the demand information storage 330.

If a certain electricity consumer 10 fails to input the bias information and/or the interval information, information that are predicted by the predictor based on histories of the bias information and the interval information, which were input by the electricity consumer 10 in the past, may be used as the bias information and the interval information.

(Computing Device 400)

The matrix generator 410 generates, based on the interval information stored in the demand information storage 330, a matrix $C=(c_{ii'j})$ which is used for calculating a "degree of continuity". The degree of continuity is an index for evaluating a deviation between an extent to which the DR time slots (or DR days) assigned to each electricity consumer 10 are continuous and the second demand, from each electricity consumer 10, regarding the extent to which the DR time slots are continuous. The degree of continuity is a value to be added as a penalty when the DR is assigned to an electricity consumer 10 concerned before a lapse of an interval between electricity saving attempts indicated by the interval information from the preceding DR assigned to the electricity consumer 10 concerned in a certain time slot of a certain day.

In the following description, parameter $x_{ij}$ is given a value "1" if the DR is assigned to an electricity consumer j (j=1, 2, 3, N) in a time slot i (i=morning of first day, daytime of first day, evening of first day, morning of second day, daytime of second day, evening of second day, morning of seventh day, daytime of seventh day, evening of seventh day), and is given a value "0" if the DR is not assigned to the electricity consumer j in the time slot i. The extent to which the DR time slots are continuous may be defined as an interval between time slots where $x_{ij}=1$, that is, an interval between adjacent DR time slots. In this embodiment, the degree-of-continuity calculator 440 of the scheduling module 430 may calculate and output to the matrix generator 410 the extent to which the DR time slots are continuous. Alternatively, the matrix generator 410 may generate the extent to which the DR time slots are continuous.

FIG. 7 shows an example matrix C generated by the matrix generator 410. The matrix C shown here is directed to the case where the DR is assigned to the electricity consumer 1 in the morning of the first day, the morning of the second day, the morning of the fourth day, and the morning of the sixth day. In the matrix C, the matrix element $c_{ii'j}$ has a value "1" if a time slot i' is one in which the electricity consumer j does not want assignment of the DR thereto when $x_{ij}=1$, and has a value "0" if the time slot i' is not one in which the electricity consumer j does not want the assignment of the DR thereto when $x_{ij}=1$. In the first embodiment, $c_{ii'j}$ may have an arbitrary one of the values "1" and "0" when $x_{ij}=0$.

As shown in FIG. 6, the interval information of the electricity consumer 1 is "2 days." Therefore, an element $c_{ii'j}$ of the matrix C has the value "1" if the DR is assigned to the electricity consumer 1 again before a lapse of two days from the assignment of the preceding DR. In this example, the degree-of-continuity calculator 440 or the matrix generator 410 may calculate the interval between the adjacent DR time slots for the electricity consumer 1 and then determine as to whether or not the calculated interval is longer than "2 days" (the interval information of the electricity consumer 1).

The matrix generator 410 generates a matrix C for each electricity consumer 10 based on an assignment pattern $x_{ij}$ (described later) calculated by the scheduling module 430.

A degree of continuity $f_j$ of each electricity consumer 10 is calculated according to the following Equation (1) using an associated matrix C:

$$f_j = \max_{i' \in I} \left\{ \sum_{i \in I} c_{ii'j} x_{ij} \right\}, \quad (j \in J) \tag{1}$$

The parameter $c_{ii'j} x_{ij}$ in Equation (1) is defined as a penalty. That is, the degree of continuity $f_j$ is a sum of the penalties and has a large value when there exist DR time slots that are not preferable to the electricity consumer j.

As shown in FIG. 2, the network generator 420 is provided with a classifier 420a and a correlating module 420b.

The classifier 420a classifies the time slots i into plural categories (kinds). The following description will be made with an assumption that the categories include morning, daytime, and evening.

The correlating module 420b generates a network which is used for calculating a degree of bias. The degree of bias is an index for evaluating a deviation between an extent to which the categories of the DR time slots assigned to each electricity consumer 10 are biased and the first demand, from each electricity consumer 10, regarding the extent to which the categories of the DR time slots are biased.

More specifically, the correlating module 420b generates nodes of an electricity consumer set J, nodes of a time slot set I, and nodes of a category set W. Then, the correlating module 420b generates a pattern of all possible combinations for connections between the nodes of the electricity consumer set J and the nodes of the time slot set I by arcs and connects the nodes of the time slot set I to the nodes of the category set W by arcs based on the classification result of the classifier 420a, thereby generating a network which correlates the nodes.

Figure 8:
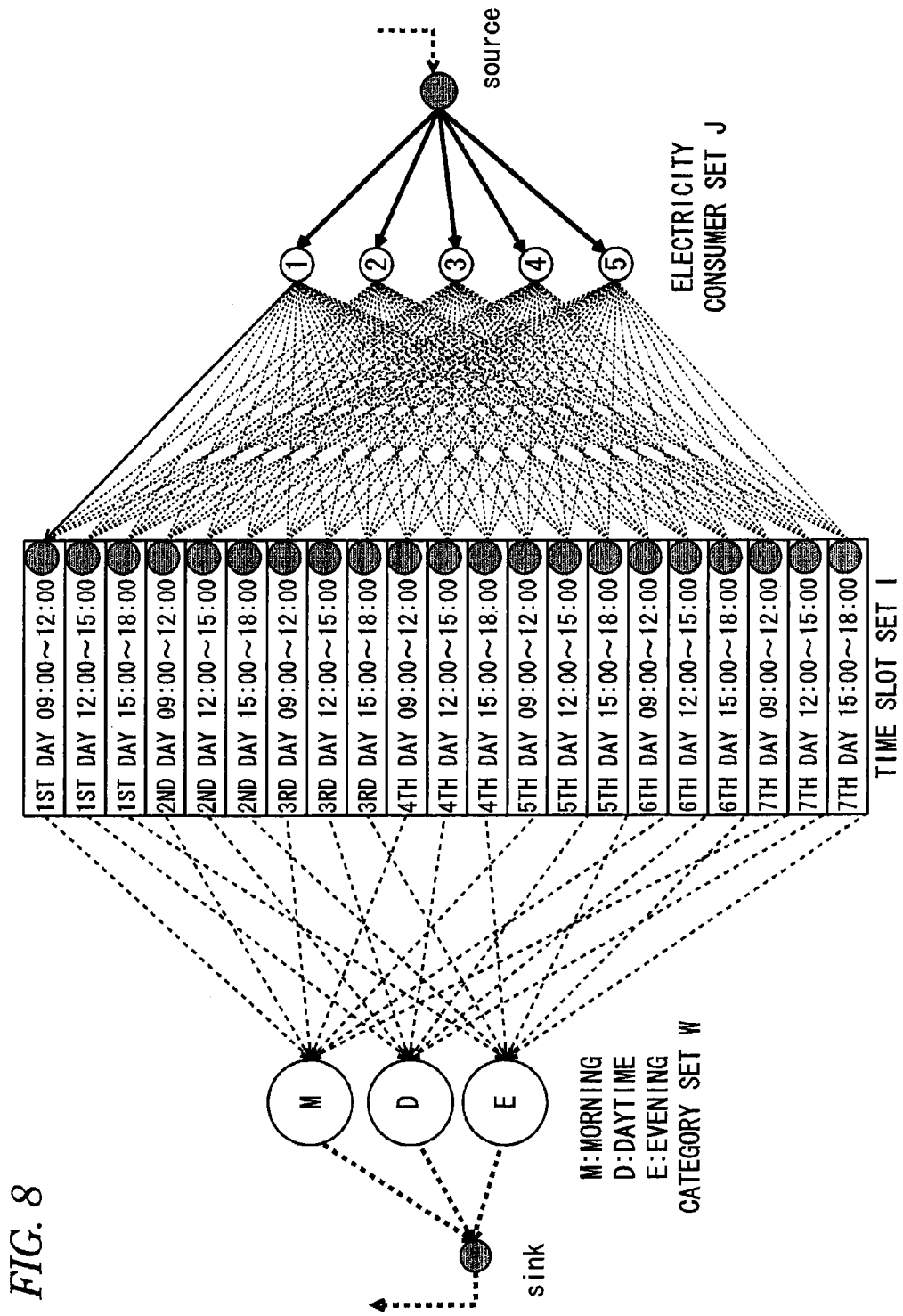
FIG. 8 shows an example of a network according to the first embodiment.

FIG. 8 shows an example network. The scheduling module 430 (described later) can generate candidate DR time slots to be assigned to each electricity consumer 10 by connecting a corresponding node of the electricity consumer set J to nodes of the time slot set I by arcs. For example, in the example of FIG. 8, the node of the electricity consumer 1 is connected to the node of the morning of the first day by a solid line, which means that the DR is assigned to the electricity consumer 1 in the morning of the first day.

Next, the degree of bias, which is calculated using the network, will be described with reference to FIG. 9. It is assumed that when a parameter $x_{ij}$ indicating as to whether or not a DR time slot i is assigned to an electricity consumer j is equal to "1," a flow of an amount "1" occurs through the arc therebetween.

(Number of Arcs Used)

The number $u_j$ of arcs that are used to connect nodes of the category set W to a sink can be calculated according to, for example, the following Formulae (2) and (3) using the network:

$$\begin{cases} u'_{wj} \in \{0, 1\}, & (w \in W, j \in J) \\ u'_{wj} \geq \dfrac{1}{\mu} \sum_{i \in ARC(w)} x_{ij} \end{cases} \tag{2}$$

$$u_j = \sum_{w \in W} u'_{wj}, \quad (j \in J) \tag{3}$$

where ARC(w) denotes a function that returns a set of time slots i that belong to the category w, and the parameter μ denotes an integer that is larger than or equal to the number ($\Sigma x_{ij}$) of DR time slots assigned to each electricity consumer j. The following description will be made with μ being set equal to $\Sigma x_{ij}$.

The number $u_j$ of arcs used is smaller when a large number of DR time slots belong to one category than when DR time slots belong to plural categories uniformly. It is therefore understood that the number $u_j$ of arcs used represents the extent to which the categories of the DR time slots are biased.

Figure 9:
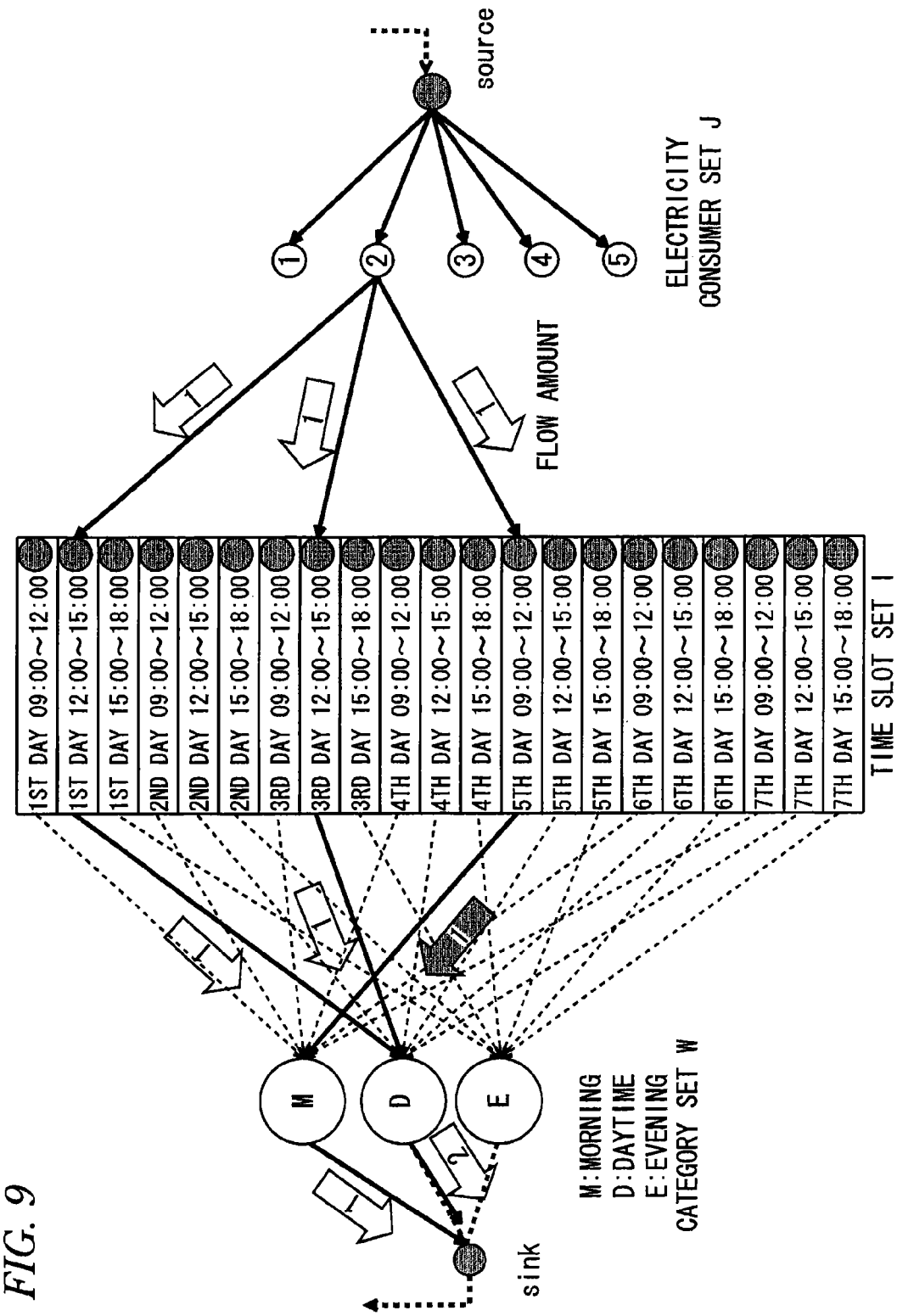
FIG. 9 illustrates how to calculate a degree of bias in the first embodiment.

In the example shown in FIG. 9 where the DR time slots are assigned to the electricity consumer 2 in the daytime of the first day, the daytime of the third day, and the morning of the fifth day, the number $u_j$ of arcs used are calculated to be "2" because the arc from the "morning" node to the sink and the arc from the "daytime" node to the sink are used.

(Maximum Flow Amount)

The use of the network makes it possible to accumulate the flow amount from each node of the category set W to the sink for all DR time slots assigned to each electricity consumer 10, and calculate a maximum one $e_j$ of the accumulated flow amounts according to the following Equation (4):

$$e_j = \max_{w \in W} \left\{ \sum_{i \in ARC(w)} x_{ij} \right\}, \quad (j \in J) \tag{4}$$

where ARC(w) denotes a function that returns a set of time slots i that belong to the category w.

The maximum flow amount $e_j$ is smaller when DR time slots belong to plural categories uniformly than when a large number of DR time slots belong to one category. It is, therefore, understood that the maximum flow amount $e_j$ represents the extent to which the categories of the DR time slots are biased.

In the example of FIG. 9, the amount of the flow from the "morning" node to the sink is "1," and the amount of the flow from the "daytime" node to the sink is "2," and the amount of the flow from the "daytime" node to the sink is "0." Therefore, the maximum flow amount $e_j$ of the electricity consumer 2 is calculated to be "2."

For example, using Equations (3) and (4), the degree of bias $g_j$ of each electricity consumer j is defined as the following Equation (5):

$$g_j = a_j u_j + b_j e_j \qquad (5)$$

where $a_j$ and $b_j$ denote constants representing the demands, from each electricity consumer j, regarding bias of categories. If the demand form the electricity consumer j indicates "bias," the constants $a_j$ and $b_j$ are given respective values "1" and "0." If the demand from the electricity consumer j is "not-bias," the constants $a_j$ and $b_j$ are given respective values "0" and "1." It is noted that the values of $a_j$ and $b_j$ are obtained based on the bias information stored in the demand information storage 330.

The scheduling module 430 creates a demand response (DR) program for the electricity consumers 10 based on the electricity consumer information stored in the electricity consumer information storage 310, the time slot information stored in the time slot information storage 320, the bias information stored in the demand information storage 330, the matrices generated by the matrix generator 410, and the network generated by the network generator 420, so as to minimize an evaluation function representing the dissatisfaction degrees of the electricity consumers 10 which are caused due to days/times in which the DR is assigned. The dissatisfaction degree of each electricity consumer 10 includes the degree of continuity and the degree of bias.

Figure 10:
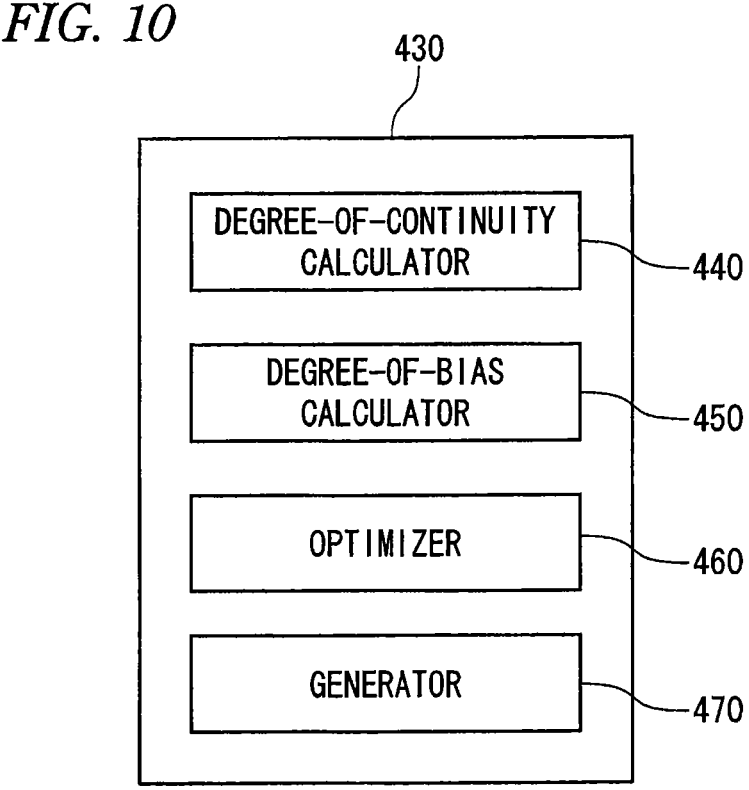
FIG. 10 shows the block diagram of a scheduling module according to the first embodiment.

FIG. 10 shows the block diagram of the scheduling module 430.

The scheduling module 430 includes a degree-of-continuity calculator 440 (an example of a third calculator), a degree-of-bias calculator 450 (an example of a first calculator), an optimizer 460 (an example of a second calculator), and a generator 470.

The degree-of-continuity calculator 440 calculates the degree of continuity $f_j$ according to Equation (1).

The degree-of-bias calculator 450 calculates the degree of bias $g_j$ according to Equation (5) using the bias information stored in the demand information storage 330.

The optimizer 460 solves an optimization problem which is represented by the following Formulae (6) to (15), for example. In the first embodiment, for example, a weighted linear sum of the number $h_j$ of time slots in which the DR is assigned to each electricity consumer j, the degree of continuity $f_j$ of each electricity consumer j, and the degree of bias $g_j$ of each electricity consumer j is used as an evaluation function.

The optimization problem to be set is not limited to an MILP (mixed integer linear programming) problem. The evaluation function and the constraint formulae are not limited to the following ones. Although the first embodiment will be described as being such as to minimize the evaluation function representing the dissatisfaction degree, the invention is not limited thereto. For example, such a modification may be made that an evaluation function representing a satisfaction degree is defined and that calculation is performed so as to maximize such an evaluation function. That is, the optimizer 460 may be in any form as long as it optimizes an evaluation function for evaluating the electricity consumers' comfort when the power reduction are requested to the electricity consumers 10.

$$\min \lambda_1 \sum_{j \in J} h_j + \lambda_2 \sum_{j \in J} f_j + \lambda_3 \sum_{j \in J} g_j \qquad (6)$$

$$\text{sub. to} \sum_{j \in J} r_j x_{ij} \geq d_i, \quad (i \in I) \qquad (7)$$

$$h_j = \sum_{i \in I} x_{ij}, \quad (j \in J) \qquad (8)$$

$$f_j = \max_{i' \in I} \left\{ \sum_{i \in I} c_{ii'} x_{ij} \right\}, \quad (j \in J) \qquad (9)$$

$$g_j = a_j u_j + b_j e_j, \quad (j \in J) \qquad (10)$$

$$u_j = \sum_{w \in W} u'_{wj}, \quad (j \in J) \qquad (11)$$

$$e_j = \max_{w \in W} \left\{ \sum_{i \in ARC(w)} x_{ij} \right\}, \quad (j \in J) \qquad (12)$$

$$u'_{wj} \geq \frac{1}{\mu} \sum_{i \in ARC(w)} x_{ij}, \quad (w \in W, j \in J) \qquad (13)$$

$$u'_{wj} \in \{0, 1\}, \quad (w \in W, j \in J) \qquad (14)$$

$$x_{ij} \in \{0, 1\}, \quad (i \in I, j \in J) \qquad (15)$$

where $\lambda_1, \lambda_2, \lambda_3$: weights;

$r_j$: electric energy that can be saved by the electricity consumer j in a time slot;

$r_j x_{ij}$: electric energy to be saved by the electricity consumer j in the time slot i;

$d_i$: electric energy that needs to be saved in the time slot i; and $a_j, b_j \in \{0, 1\}$: the constants representing the demands, from the electricity consumer j, regarding the bias of the categories of the time slots.

The optimizer 460 determines, as a solution, decision variables $x_{ij}$ (a manner of assignment of DR time slots) for all the electricity consumers j and all the time slots i so as to minimize the evaluation function (Formula (6)).

The generator 470 generates a demand response (DR) program that assigns DR time slots to the electricity consumers 10 according to the decision variables $x_{ij}$, which are obtained finally by the optimizer 460.

Figure 11:
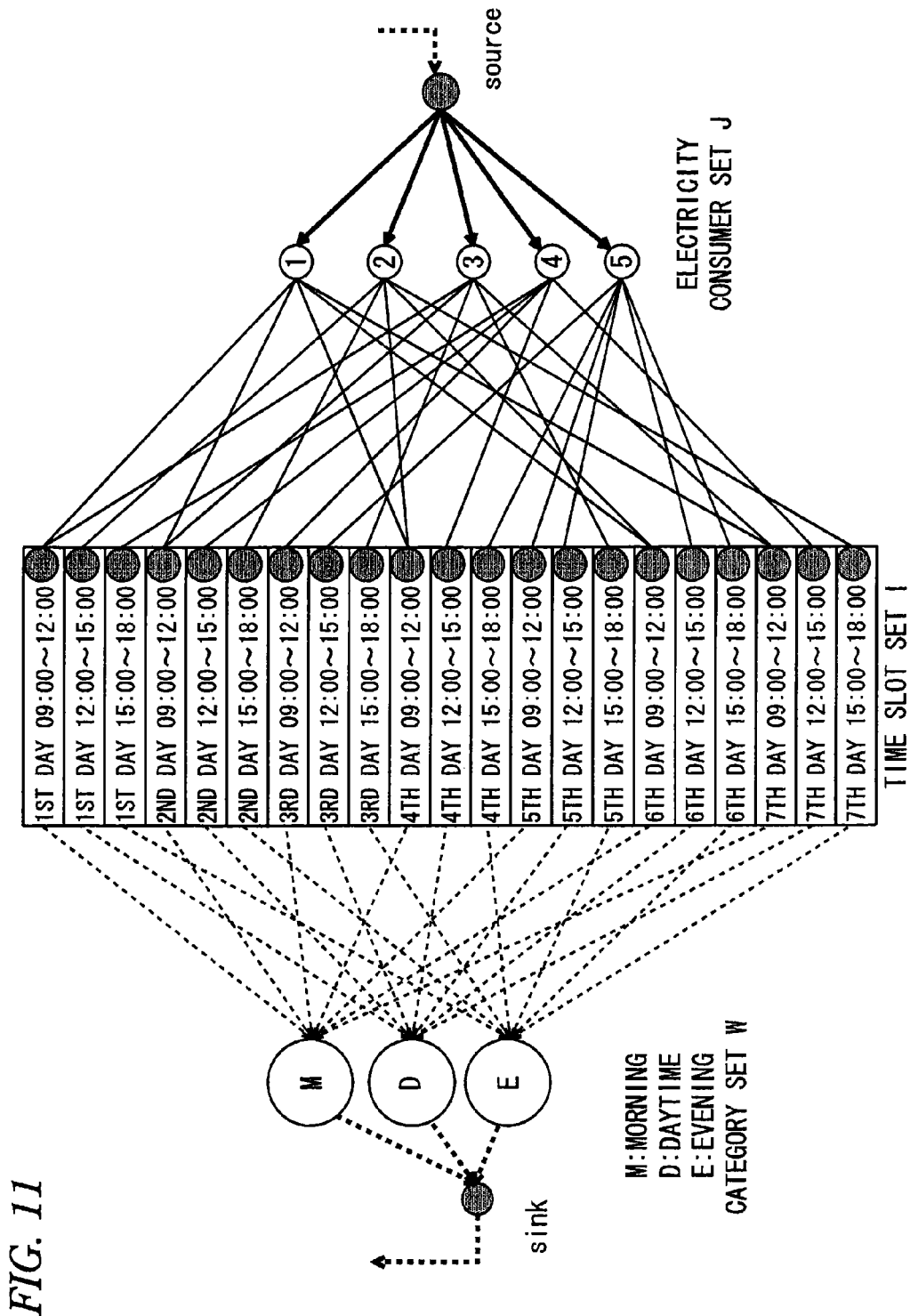
FIG. 11 shows an example of a demand response (DR) program according to the first embodiment.

FIG. 11 shows an example of the demand response (DR) program generated by the optimizer 460. Connecting a node of an electricity consumer j and a node of a time slot i by an arc means that the DR is assigned to the electricity consumer j in the time slot i ($x_{ij}$=1). On the other hand, not connecting a node of an electricity consumer j and a node of a time slot i by an arc means that the DR is not assigned to the electricity consumer j in the time slot ($x_{ij}$=0).

A process executed by the scheduling apparatus 100 will be described below with reference to flowcharts of FIGS. 12 and 13.

Figure 12:
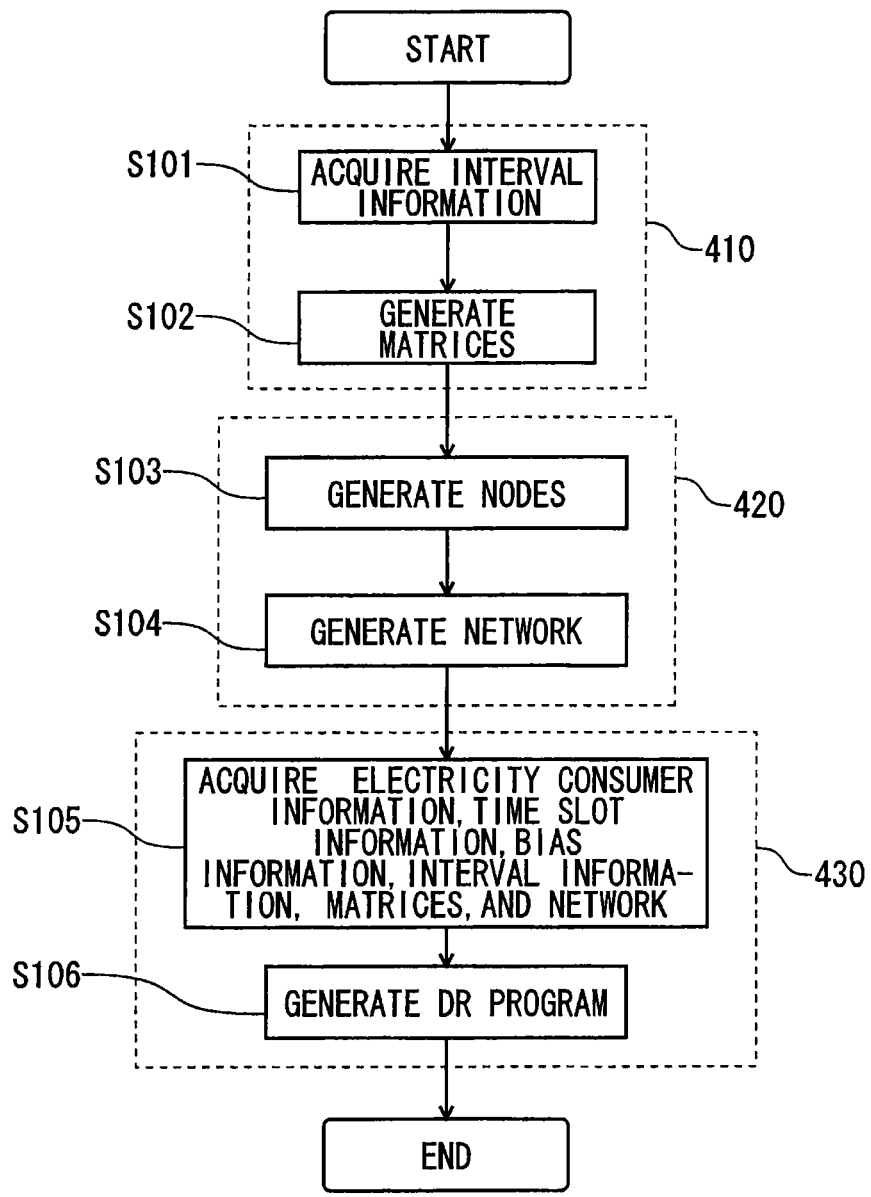
FIG. 12 is a flowchart showing the entire process executed by the scheduling apparatus according to the first embodiment.

FIG. 12 is a flowchart showing the entire process executed by the scheduling apparatus 100.

At step S101, the matrix generator 410 acquires the interval information stored in the demand information storage 330. At step S102, the matrix generator 410 generates, using the acquired interval information, matrices C to be used for calculating degrees of continuity. The matrices C may be stored in the storage device 300 temporarily.

At step S103, the network generator 420 generates nodes of an electricity consumer set J, nodes of a time slot set I, and nodes of a category set W. At step S104, the network generator 420 generates a network that correlates the nodes of the electricity consumer set J and the nodes of the time slot set I and also correlates the nodes of the time slot set I and the nodes of the category set W. The generated network may be stored in the storage device 300 temporarily.

At step S105, the scheduling module 430 acquires the electricity consumer information stored in the electricity consumer information storage 310, the time slot information stored in the time slot information storage 320, the bias information and the interval information which are stored in the demand information storage 330, the matrices C generated by the matrix generator 410, and the network generated by the network generator 420. At step S106, the scheduling module 430 creates a DR program using the electricity consumer information, the time slot information, the bias information, the interval information, the matrices and the network, so as to optimize the evaluation function (Formula (6)) under the constraint conditions (Formulae (7) to (15)).

Figure 13:
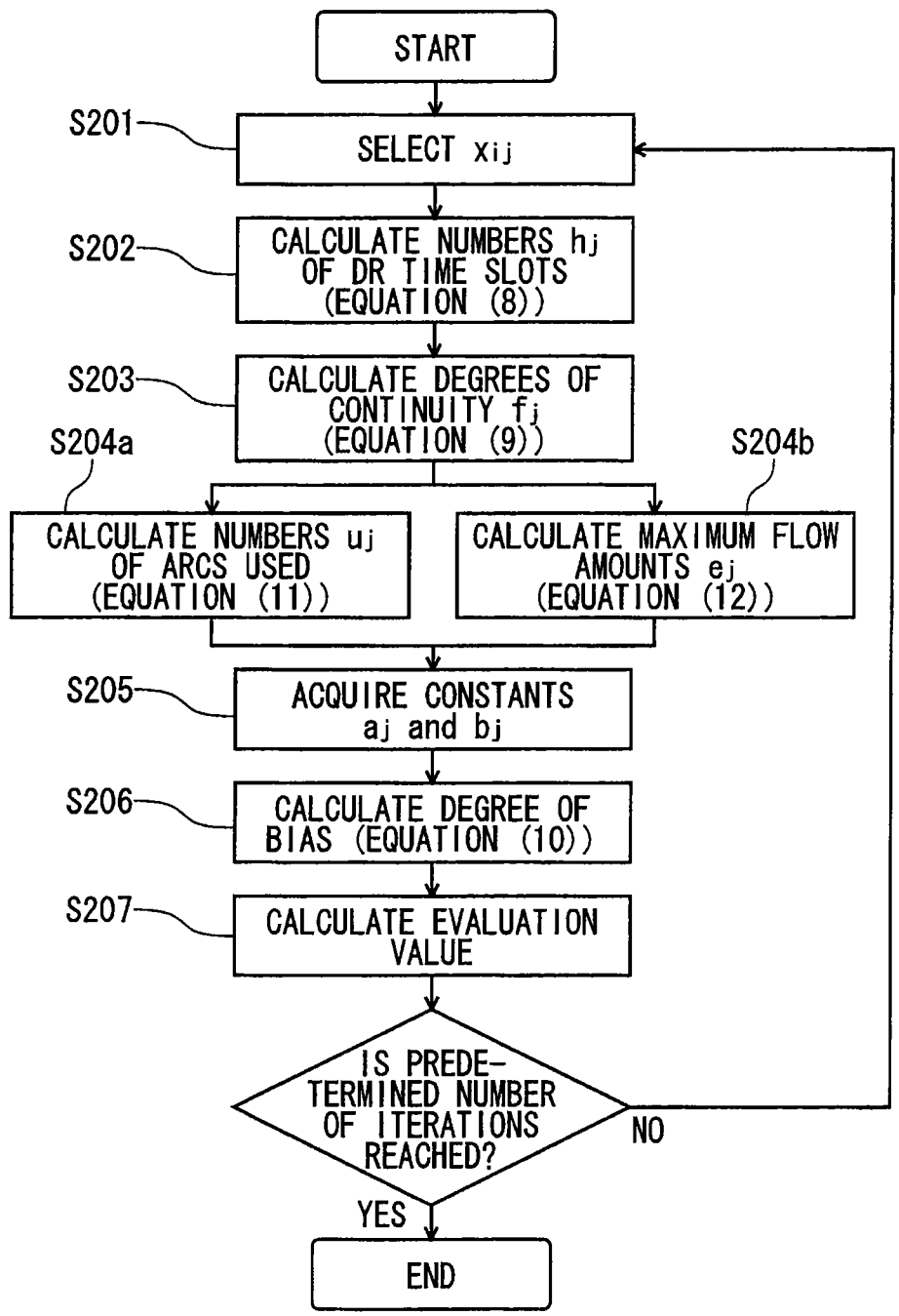
FIG. 13 is a flowchart showing a process executed by the scheduling module according to the first embodiment.

FIG. 13 is a flowchart of a process executed by the scheduling module 430.

At step S201, the optimizer 460 selects combinations of arcs that connect the nodes of the network (i.e., $x_{ij}=1$) under the conditions of Formulae (7) and (15) using the electricity consumer information, the time slot information, and the network. At step S202, the optimizer 460 calculates the number $h_j$ of DR time slots to be assigned to each electricity consumer j based on Equation (8) and the combinations of arcs selected (i.e., $x_{ij}=1$) at step S201.

At step S203, the degree-of-continuity calculator 440 calculates a degree of continuity $f_j$ of each electricity consumer j based on Equation (9), the matrix, and the combinations of arcs selected (i.e., $x_{ij}=1$) at step S201.

At step 204a, the degree-of-bias calculator 450 calculates the number $u_j$ of arcs used of each electricity consumer j according to Equation (11) under the conditions of Formulae (13) and (14). At step S204b, the degree-of-bias calculator 450 calculates the maximum flow amount $e_j$ of each electricity consumer j according to Equation (12).

At step S205, the degree-of-bias calculator 450 acquires the constants $a_j$ and $b_j$ for each electricity consumer j based on the bias information. More specifically, the degree-of-bias calculator 450 acquires $a_j=1$ and $b_j=0$ for an electricity consumer j whose demand is "bias," and acquires $a_j=0$ and $b_j=1$ for an electricity consumer j whose demand is "not-bias." At step S206, the degree-of-bias calculator 450 calculates a degree of bias $g_j$ of each electricity consumer j based on Equation (10), the constants $a_j$ and $b_j$ acquired at step S205, the number $u_j$ of arcs used calculated at step S204a, and the maximum flow amount $e_j$ calculated at step S204b.

At step S207, the optimizer 460 calculates an evaluation value based on Formula (6), the numbers $h_j$ of DR time slots calculated at step S202, the degrees of continuity $f_j$ calculated at step S203, and the degrees of bias $g_j$ calculated at step S206.

Steps S201 to S207 are executed repeatedly so as to minimize the evaluation value. For example, the iteration is finished when the number of iterations has reached a predetermined number, and $x_{ij}$ obtained at that time is employed as an optimum solution.

The parameter $h_j$ which is included in the evaluation function may be total electric energy to be saved by each electricity consumer j instead of the number of DR time slots assigned to each electricity consumer j. Although in the first embodiment the parameter $h_j$ is included in the evaluation function, such a modification may be made that an upper limit of $h_j$ that is acceptable to each electricity consumer j is set in advance and used as one of the constraint conditions of the optimization problem Also, in first the embodiment, the network generator 420 generates nodes "morning," "daytime," and "evening" as nodes of the category set. However, nodes of the category set are not limited thereto. The network generator 420 may generate nodes "Sunday," "Monday," "Tuesday," "Wednesday," "Thursday," "Friday," and "Saturday," nodes "holiday" and "weekday," or the like.

Also, in the first embodiment, each electricity consumer 10 designates one of the two items "bias" and "not-bias" as the first demand. Alternatively, each electricity consumer 10 may directly specify a desired time slot in which the DR is assigned to each electricity consumer 10. In this case, the scheduling module 430 can specify as to which of "bias" or "not-bias" each electricity consumer 10 demands by evaluating, based on the designated information, the extent to which the categories of the time slots are biased.

Also, such a modification may be made that a network generated by the network generator 420 is stored in the storage device 300 in advance and that the scheduling module 430 creates a DR program by acquiring the network from the storage device 300.

Also, in the first embodiment, the electric supply company 30 which distribute electricity to the electricity consumers 10 is equipped with the scheduling apparatus 100. Alternatively, a company which runs a business of mediating between the electric supply company 30 and the electricity consumers 10 may be equipped with the scheduling apparatus 100.

Also, in the first embodiment, each electricity consumer 10 is requested to make power reduction. Alternatively, each electricity consumer 10 may be requested to increase the electricity consumption or may receive a request regarding usage of electricity such as electric-generating capacity or an electricity charge amount.

The degree-of-continuity calculator 440 (an example of the third calculator), the degree-of-bias calculator 450 (an example of the first calculator), the optimizer 460 (an example of the second calculator), and the generator 470 of the scheduling module 430 may be implemented by one and the same computing device or implemented in such a manner that part of them are incorporated in another computing device. The classifier 420a and the correlating module 420b of the network generator 420 may be implemented either by one and the same computing device or different computing devices.

(Embodiment 2)

In the scheduling apparatus 100 according to the first embodiment, the network generator 420 generates the nodes "morning," "daytime," and "evening" as nodes of the category set. However, the invention is not limited thereto. As mentioned above, other elements relating to the day/time such as "holiday" and "weekday" or "Sunday," "Monday," "Tuesday," "Wednesday," "Thursday," "Friday," and "Saturday" may be employed as nodes of the category set.

Figure 14:
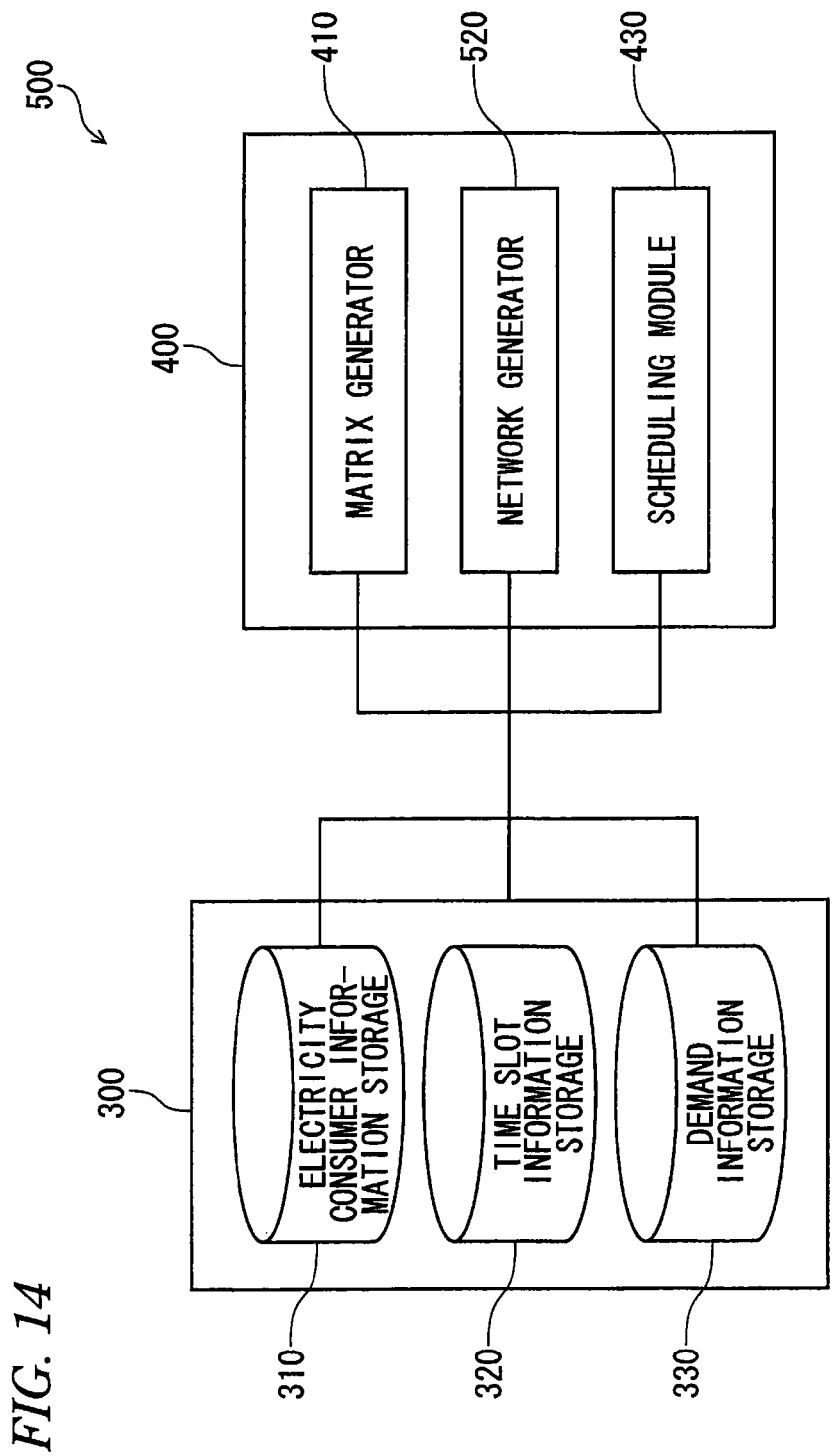
FIG. 14 shows the block diagram of a scheduling apparatus according to a second embodiment.

FIG. 14 shows the block diagram of a scheduling apparatus 500 according to a second embodiment.

The scheduling apparatus 500 is different from the scheduling apparatus 100 according to the first embodiment in that a network generator 520 generates nodes of plural category sets.

Figure 15:
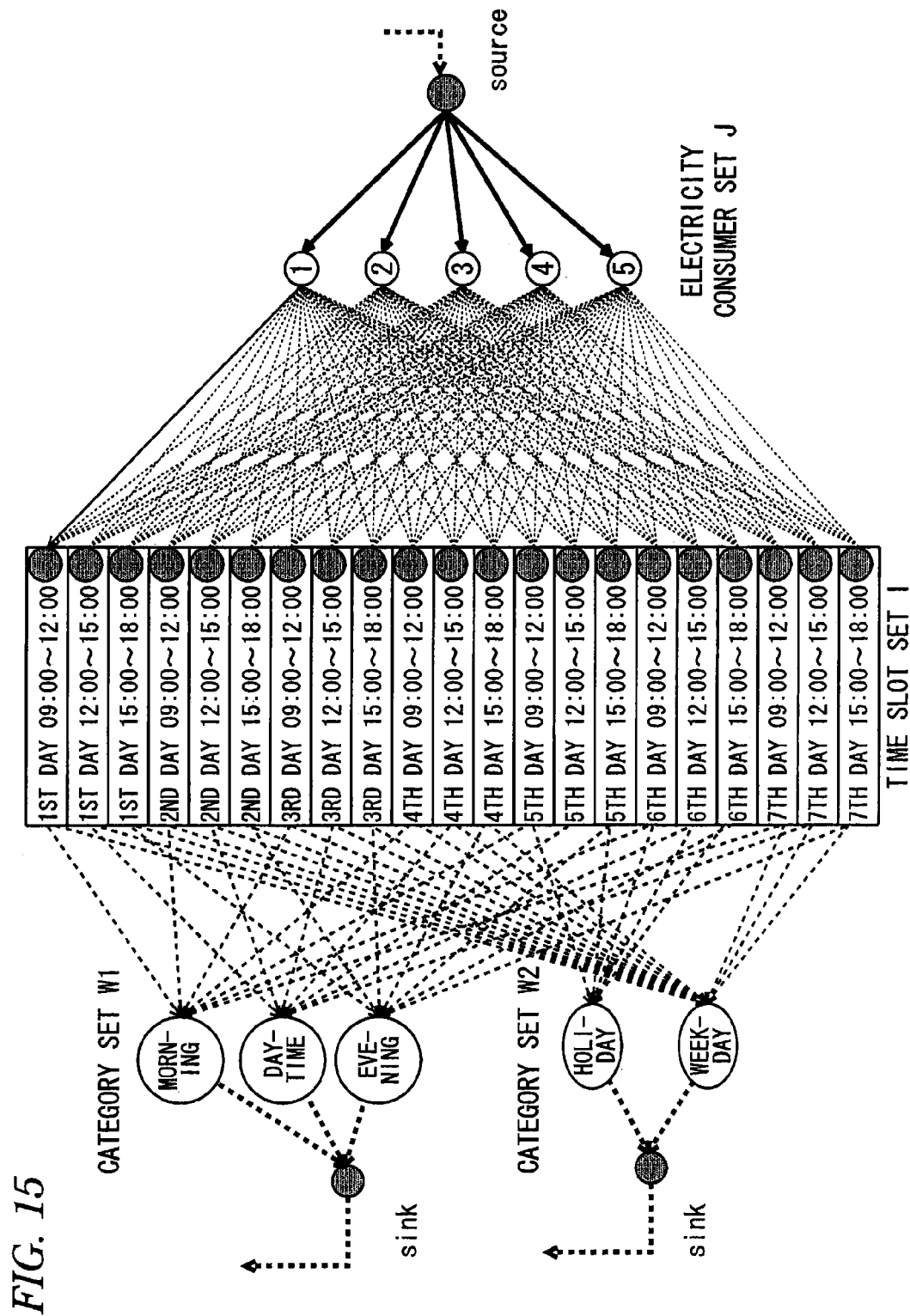
FIG. 15 shows an example of a network according to the second embodiment.

The network generator 520 generates nodes of the electricity consumer set J, nodes of the time slot set I, and nodes of plural category sets $W_s$. Then, the network generator 520 generates a pattern of all possible combinations for connections between the nodes of the electricity consumer set J and the nodes of the time slot set I by arcs and connects the nodes of the time slot set I to the nodes of the category sets $W_s$ by arcs, thereby generating a network which correlates the nodes. FIG. 15 shows an example of the network in which a category set $W_1$ includes "morning," "daytime," and "evening" and a category set $W_2$ includes "holiday" and "weekday."

The numbers $u_{sj}$ of arcs used and the maximum flow rates $e_{sj}$ can be calculated based on the following Formulae (16) to (18) and the network:

(Number of Arcs Used)

$$\begin{cases} u'_{wj} \in \{0, 1\}, & (w_s \in W_s, s \in S, j \in J) \\ u'_{wj} \geq \dfrac{1}{\mu} \displaystyle\sum_{i \in ARC(w_s)} x_{ij} \end{cases} \quad (16)$$

$$u_{sj} = \sum_{w_s \in W_s} u'_{w_s j}, \quad (s \in S, j \in J) \quad (17)$$

(Maximum Flow Amount)

$$e_{sj} = \max_{w_s \in W_s} \left\{ \sum_{i \in ARC(w_s)} x_{ij} \right\}, \quad (s \in S, j \in J) \quad (18)$$

Using Equations (17) and (18), the degree of bias of each electricity consumer j is defined, for example, as the following Equation (19):

$$g_{sj} = a_{sj} u_{sj} + b_{sj} e_{sj} \quad (19)$$

where $a_{sj}$ and $b_{sj}$ denote constants representing the demands regarding bias of categories of DR time slots assigned to each electricity consumer j. If the demand for a categorization type s is "bias," the constants $a_{sj}$ and $b_{sj}$ are given respective values "1" and "0." If the demand for the categorization type s is "not-bias," the constants $a_{sj}$ and $b_{sj}$ are given respective values "0" and "1." The values of $a_{sj}$ and $b_{sj}$ are, for example, specified by each electricity consumer j in advance, and obtained based on bias information for each categorization type s stored in the demand information storage 330 (see FIG. 16).

The scheduling module 430 creates a DR program by solving an optimization problem which is represented by the following Formulae (20) to (29) using the electricity consumer information stored in the electricity consumer information storage 310, the time slot information stored in the time slot information storage 320, the bias information and the interval information stored in the demand information storage 330, matrices generated by the matrix generator 410, and the network generated by the network generator 520.

$$\min \lambda_1 \sum_{j \in J} h_j + \lambda_2 \sum_{j \in J} f_j + \sum_{s \in S} \left( \lambda_{3s} \sum_{j \in J} g_{sj} \right) \quad (20)$$

$$\text{sub. to } \sum_{j \in J} r_j x_{ij} \geq d_i, \quad (i \in I) \quad (21)$$

$$h_j = \sum_{i \in I} x_{ij}, \quad (j \in J) \quad (22)$$

$$f_j = \max_{i' \in I} \left\{ \sum_{i \in I} c_{ii'} x_{ij} \right\}, \quad (j \in J) \quad (23)$$

$$g_{sj} = a_{sj} u_{sj} + b_{sj} e_{sj}, \quad (s \in S, j \in J) \quad (24)$$

$$u_{sj} = \sum_{w_s \in W_s} u'_{w_s j}, \quad (s \in S, j \in J) \quad (25)$$

$$e_{sj} = \max_{w_s \in W_s} \left\{ \sum_{i \in ARC(w_s)} x_{ij} \right\}, \quad (s \in S, j \in J) \quad (26)$$

$$u'_{w_s j} \geq \frac{1}{\mu} \sum_{i \in ARC(w_s)} x_{ij}, \quad (w_s \in W_s, s \in S, j \in J) \quad (27)$$

$$u'_{wj} \in \{0, 1\}, \quad (w \in W, j \in J) \quad (28)$$

$$x_{ij} \in \{0, 1\}, \quad (i \in I, j \in J) \quad (29)$$

where $\lambda_1, \lambda_2$: weights;

$\lambda_{3s}$: a weight for the degree of bias of the categorization type s;

$r_j$: electric energy that can be saved by the electricity consumer j in each time slot;

$r_j x_{ij}$: electric energy to be saved by the electricity consumer j in the time slot I;

$d_i$: electric energy that needs to be saved in the time slot i; and $a_{sj}, b_{sj} \in \{0, 1\}$: constants representing demands, from the electricity consumer j, regarding bias in the categorization type s.

(Modification Example 1)

A situation where it is preferable for each electricity consumer 10 to switch the electricity saving level occurs depending on the seriousness of electricity shortage. For example, it is assumed that there are three electricity saving levels "low," "medium," and "high." There may occur a situation that it is preferable for each electricity consumer 10 to set the electricity saving level to "high" when the electricity demand is expected to be much higher than generated (supplied) electric energy, that it is preferable for each electricity consumer 10 to set the electricity saving level to "low" when the electricity demand is expected to be much lower than generated electric energy, and that it is preferable for each electricity consumer 10 to set the electricity saving level to "medium" when the electricity supply is expected to be done ordinarily.

In a scheduling apparatus 100 according to a first modification, the scheduling module 430 creates the DR program taking plural electricity saving levels to be employed by each electricity consumer 10 into consideration.

The electricity consumer information storage 310 stores electric energy (kWh) that can be saved by each electricity consumer 10 for the respective electricity saving forms. FIG.

17 shows an example of the electricity consumer information according to the first modification.

The scheduling module 430 creates a DR program by solving an optimization problem which is represented by the following Formulae (30) to (41) based on the electricity consumer information stored in the electricity consumer information storage 310, the time slot information stored in the time slot information storage 320, the bias information and the interval information stored in the demand information storage 330, the matrices generated by the matrix generator 410, and the network generated by the network generator 420.

$$\min \lambda_1 \sum_{j \in J} h_j + \lambda_2 \sum_{j \in J} f_j + \lambda_3 \sum_{j \in J} g_j + \lambda_4 L \quad (30)$$

$$sub. \text{ to } \sum_{k \in K} \sum_{j \in J} r_{kj} x_{kij} \geq d_i, \quad (i \in I) \quad (31)$$

$$h_j = \sum_{k \in K} \sum_{i \in I} x_{kij}, \quad (j \in J) \quad (32)$$

$$\sum_{k \in K} x_{kij} \leq 1, \quad (i \in I, j \in J) \quad (33)$$

$$f_j = \max_{i' \in I} \left\{ \sum_{k \in K} \sum_{i \in I} c_{ii'j} x_{kij} \right\}, \quad (j \in J) \quad (34)$$

$$g_j = a_j u_j + b_j e_j, \quad (j \in J) \quad (35)$$

$$u_j = \sum_{w \in W} u'_{wj}, \quad (j \in J) \quad (36)$$

$$e_j = \max_{w \in W} \left\{ \sum_{i \in ARC(w)} \sum_{k \in K} x_{kij} \right\}, \quad (j \in J) \quad (37)$$

$$L = \max_{i \in I, j \in J} \left\{ \sum_{k \in K} \omega_k x_{kij} \right\} \quad (38)$$

$$u'_{wj} \geq \frac{1}{\mu} \sum_{i \in ARC(w)} \sum_{k \in K} x_{kij}, \quad (w \in W, j \in J) \quad (39)$$

$$u'_{wj} \in \{0, 1\}, \quad (w \in W, j \in J) \quad (40)$$

$$x_{kij} \in \{0, 1\}, \quad (k \in K, i \in I, j \in J) \quad (41)$$

where $\lambda_1, \lambda_2, \lambda_3, \lambda_4$: weights;
$\omega_k$: weight corresponding to the electricity saving level k;
$r_{kj}$: electric energy that can be saved by the electricity consumer j in a time slot when the electricity saving level is the level k;
$r_{kj} x_{kij}$: electric energy to be saved by the electricity consumer j in the time slot i when the electricity saving level is the level k;
$d_i$: electric energy that needs to be saved in the time slot i, and
$a_j, b_j \in \{0, 1\}$: constants representing demands, from the electricity consumer j, regarding bias of categories.
(Modification 2)

In the first embodiment, the scheduling module 430 creates a DR program in which the electricity consumer j to which a DR time slot i (i.e., $x_{ij}=1$) is assigned will save the entire electric energy that it can save. However, the invention is not limited to the case that the electric energy to be saved by each electricity consumer 10 is binary values. The electric energy to be saved by each electricity consumer 10 may be set continuously within a reducible electric energy range specified by each electricity consumer 10.

In a scheduling apparatus 100 according to the second modification, the scheduling module 430 creates a DR program in such a manner that the electric energy that can be saved by each electricity consumer 10 can be set continuously.

The scheduling module 430 creates a DR program by solving an optimization problem which is represented by the following Formulae (42) to (53) using the electricity consumer information stored in the electricity consumer information storage 310, the time slot information stored in the time slot information storage 320, the bias information and the interval information stored in the demand information storage 330, the matrices generated by the matrix generator 410, and the network generated by the network generator 420.

$$\min \lambda_1 \sum_{j \in J} f_j + \lambda_2 \sum_{j \in J} g_j \quad (42)$$

$$sub. \text{ to } \sum_{j \in J} r_j y_{ij} = d_i, \quad (i \in I) \quad (43)$$

$$x_{ij} \geq y_{ij}, \quad (i \in I, j \in J) \quad (44)$$

$$f_j = \max_{i' \in I} \left\{ \sum_{i \in I} c_{ii'j} x_{ij} \right\}, \quad (j \in J) \quad (45)$$

$$g_j = a_j u_j + b_j e_j, \quad (j \in J) \quad (46)$$

$$u_j = \sum_{w \in W} u'_{wj}, \quad (j \in J) \quad (47)$$

$$e_j = \max_{w \in W} \left\{ \sum_{i \in ARC(w)} x_{ij} \right\}, \quad (j \in J) \quad (48)$$

$$u'_{wj} \geq \frac{1}{\mu} \sum_{i \in ARC(w)} x_{ij}, \quad (w \in W, j \in J) \quad (49)$$

$$u'_{wj} \in \{0, 1\}, \quad (w \in W, j \in J) \quad (50)$$

$$x_{ij} \in \{0, 1\}, \quad (i \in I, j \in J) \quad (51)$$

$$0 \leq y_{ij} \leq 1, \quad (i \in I, j \in J) \quad (52)$$

$$y_{ij} \in \text{real number}, \quad (i \in I, j \in J) \quad (53)$$

where $\lambda_1, \lambda_2$: weights;
$r_j$: maximum electric energy that can be saved by the electricity consumer j in a time slot;
$r_j y_{ij}$: electric energy to be saved by the electricity consumer j in the time slot i;
$d_i$: electric energy that needs to be saved in the time slot i; and
$a_j, b_j \in \{0, 1\}$: constants representing demands, from each electricity consumer j, regarding bias of categories.

The scheduling apparatus according to at least one of the above-described embodiments and modifications can reduce an affect, which is caused by electricity reduction requests, on electricity consumers' comfort and convenience.

The scheduling method according to the above-described embodiments and modifications may be implemented by a computer (including at least a CPU, a processor and/or a memory), and may be distributed in the form of a computer-executable program that is stored in a computer-readable storage medium such as a magnetic disk (flexible disk, hard disk, or the like), an optical disc (CD-ROM, DVD, or the like), an magneto-optical disc (MO), or a semiconductor memory.

The scheduling method according to the above-described embodiments and modifications may be implemented by either hardware or a combination of hardware and software. In the latter case, the software is a program that is pre-installed in a computer from a network or a computer-readable storage medium and serves to realize the functions of the scheduling apparatus on the computer.

The above-described embodiments and modifications are just examples and should not be construed as restricting the scope of the invention. Each of these embodiments and modifications may be practiced in other various forms, and part of them may be omitted, replaced by other elements, or changed in various manners without departing from the spirit and scope of the invention. These modifications are also included in the invention as claimed and its equivalents.

What is claimed is:

1. A scheduling apparatus comprising:
a first calculator configured to calculate an assignment of plural time slots to an electricity consumer, each of the plural time slots is classified into any of categories comprising a morning slot, a daytime slot, and an evening slot;
a storage configured to store
a first demand, from the electricity consumer, regarding a requested extent to which the categories associated with the assignment are biased, and
a second demand, from the electricity consumer, regarding an extent to which the assigned time slots are continuous,
a second calculator configured to calculate an extent to which the categories associated with the assignment calculated by the first calculator are biased and calculate a first evaluation value representing a deviation between the first demand and the extent calculated by the second calculator; and
a third calculator configured to
calculate an extent to which the time slots assigned to the electricity consumer are continuous based on the assignment calculated by the first calculator, and
calculate a second evaluation value representing a deviation between the second demand and the extent calculated by the third calculator,
wherein
the first calculator calculates the assignment so as to optimize an evaluation function including the first evaluation value and the second evaluation value, and
the first calculator includes a generator configured to generate a demand reduction assignment program for the electricity consumer based on the assignment calculated by the first calculator.

2. The apparatus of claim 1, wherein
the first demand indicates one of
an item that the categories of the time slots assigned to the electricity consumer are biased, and
an item that the categories of the time slots assigned to the electricity consumer are not biased, and
the second calculator is configured to calculate
u indicating the number of categories associated with the assignment calculated by the first calculator, and
e indicating a maximum number among the numbers of assigned time slots of the respective categories, and calculate g as the first evaluation value according to an equation $$g = au + be$$

where a denotes an integer that has
1 when the first demand indicates that the categories of the time slots assigned to the electricity consumer are biased, and
0 when the first demand indicates that the categories of the time slots assigned to the electricity consumer are not biased, and
b denotes an integer that has
0 when the first demand indicates that the categories of the time slots assigned to the electricity consumer are biased, and
1 when the first demand indicates that the categories of the time slots assigned to the electricity consumer are not biased.

3. The apparatus of claim 1, wherein
the second demand indicates an interval between the time slots to be assigned to the electricity consumer, and
the third calculator is configured to calculate the second evaluation value so that a penalty is added to the second evaluation value if an interval between the time slots of the assignment calculated by the first calculator is equal to or shorter than the second demand.

4. The apparatus of claim 1, wherein
there is a plurality of electricity consumers,
the first calculator is configured to calculate the assignment of the plural time slots to the electricity consumers,
the storage is configured to further store
electric energy that can be saved by each electricity consumer j in a time slot, and
whole electric energy that needs to be saved in each time slot i, and
the first calculator is configured to calculate the assignment $x_{ij}$ by solving an optimization problem including an evaluation function and constraint conditions given by the following formulae:

$$\min \lambda_1 \sum_{j \in J} f_j + \lambda_2 \sum_{j \in J} g_j$$

$$sub. \text{ to } \sum_{j \in J} r_j x_{ij} \geq d_i, \quad (i \in I)$$

$$x_{ij} \in \{0, 1\}, \quad (i \in I, j \in J)$$

where
$\lambda_1$ and $\lambda_2$ denote weights,
$f_j$ denotes the second evaluation value of each electricity consumer j,
$g_j$ denotes the first evaluation value of each electricity consumer j,
$r_j$ denotes the electric energy that can be saved by each electricity consumer j in a time slot,
$d_i$ denotes the whole electric energy that needs to be saved in each time slot i, and
$x_{ij}$ denotes a parameter indicating as to whether or not each time slot i is assigned to each electricity consumer j.

5. A scheduling apparatus comprising:
a first calculator configured to calculate an assignment of plural time slots to an electricity consumer, each of the plural time slots is classified into any of categories comprising a morning slot, a daytime slot, and an evening slot;

a storage configured to store a first demand, from the electricity consumer, regarding a requested extent to which the categories associated with the assignment are biased; and a second calculator configured to calculate an extent to which the categories associated with the assignment calculated by the first calculator are biased and calculate a first evaluation value representing a deviation between the first demand and the extent calculated by the second calculator, wherein the first calculator calculates the assignment so as to optimize an evaluation function including the first evaluation value, the first calculator includes a generator configured to generate a demand reduction assignment program for the electricity consumer based on the assignment calculated by the first calculator, the first demand indicates one of
an item that the categories of the time slots assigned to the electricity consumer are biased, and
an item that the categories of the time slots assigned to the electricity consumer are not biased, and the second calculator is configured to
calculate
u indicating the number of categories associated with the assignment calculated by the first calculator, and
e indicating a maximum number among the numbers of assigned time slots of the respective categories, and
calculate g as the first evaluation value according to an equation $g = au + be$ where a denotes an integer that has
1 when the first demand indicates that the categories of the time slots assigned to the electricity consumer are biased, and
0 when the first demand indicates that the categories of the time slots assigned to the electricity consumer are not biased, and b denotes an integer that has
0 when the first demand indicates that the categories of the time slots assigned to the electricity consumer are biased, and
1 when the first demand indicates that the categories of the time slots assigned to the electricity consumer are not biased.

6. A scheduling method comprising:

classifying plural time slots each of which is represented by at least date and time into any of categories comprising a morning slot, a daytime slot, and an evening slot calculating an assignment of the time slots to an electricity consumer;

associating the assigned time slots with the categories;

calculating an extent to which the categories associated with the calculated assignment are biased;

calculating a first evaluation value representing a deviation between a first demand, from the electricity consumer, regarding a requested extent to which the categories associated with the assignment are biased and the calculated extent;

calculating an extent to which the time slots assigned to the electricity consumer are continuous based on the calculated assignment; and calculating a second evaluation value representing a deviation between a second demand, from the electricity consumer, regarding an extent to which the assigned time slots are continuous and the calculated extent to which the time slots assigned to the electricity consumer are continuous, wherein the calculating the assignment is performed so as to optimize an evaluation function including the first evaluation value and the second evaluation value, and the calculating the assignment includes generating a demand reduction assignment program for the electricity consumer based on the calculated assignment.

7. A non-transitory computer-readable storage medium storing a scheduling program that is executable by a computer, the scheduling program comprising:

classifying plural time slots each of which is represented by at least date and time into any of categories comprising a morning slot, a daytime slot, and an evening slot;

calculating an assignment of the time slots to an electricity consumer;

associating the assigned time slots with the categories;

calculating an extent to which the categories associated with the calculated assignment are biased;

calculating a first evaluation value representing a deviation between a first demand, from the electricity consumer, regarding a requested extent to which the categories associated with the assignment are biased and the calculated extent;

calculating an extent to which the time slots assigned to the electricity consumer are continuous based on the calculated assignment; and calculating a second evaluation value representing a deviation between a second demand, from the electricity consumer, regarding an extent to which the assigned time slots are continuous and the calculated extent to which the time slots assigned to the electricity consumer are continuous, wherein the calculating the assignment is performed so as to optimize an evaluation function including the first evaluation value and the second evaluation value, and the calculating the assignment includes generating a demand reduction assignment program for the electricity consumer based on the calculated assignment.

* * * * *